March 11, 1924.

H. G. CARLSON

METHOD OF MAKING CHUCK SLEEVES

Filed Nov. 22, 1922

1,486,280

Inventor:
Hjalmar G. Carlson
By Attorneys
Southgate & Southgate

Patented Mar. 11, 1924.

1,486,280

UNITED STATES PATENT OFFICE.

HJALMAR G. CARLSON, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS.

METHOD OF MAKING CHUCK SLEEVES.

Application filed November 22, 1922. Serial No. 602,636.

*To all whom it may concern:*

Be it known that I, HJALMAR G. CARLSON, a citizen of the United States, residing at Worcester, in the county of Worcester and State of Massachusetts, have invented a new and useful Method of Making Chuck Sleeves, of which the following is a specification.

This invention relates to a method of manufacturing a chuck sleeve or other article of a similar shape from wrought or sheet metal.

The principal objects of the invention are to provide an improved method of making the tapered or jaw end of the chuck sleeve so as to provide it with an abrupt shoulder at the end of the taper without pressing the said shoulder over a plunger and thus avoiding the necessity of finishing and sizing a plunger to produce the exact dimensions required; and also to provide an improved method of opening the end of the ordinary closed cup-shaped tube to provide the open end of the chuck sleeve at the threaded end.

I have found that it is not necessary to use a taper ended plunger to shape the internal conical surface of a chuck sleeve or article of similar nature and that the same can be made much more simply and inexpensively without the sacrifice of accuracy by shaping it in external dies after a cup of the proper size is shaped up, and I also find that the closed end of the cup can be opened by punching out the bottom, as distinguished from cutting off the end of the cup and then having to finish up the rough edges of the same.

Figure 1:
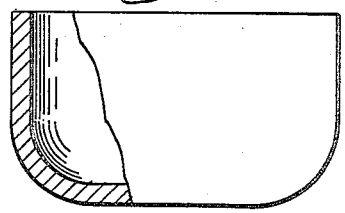
Fig. 1 is a side view partly in section showing the first step of the process of manufacture.
Figure 2:
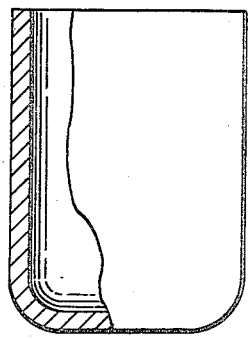
Figs. 2, 3 and 4 are similar views showing the next three steps.
Figure 3:
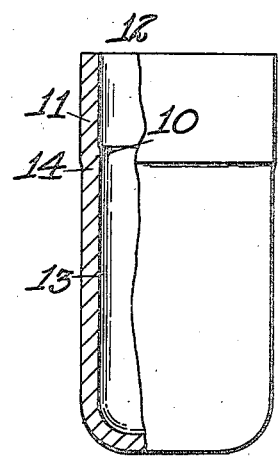
Figure 7:
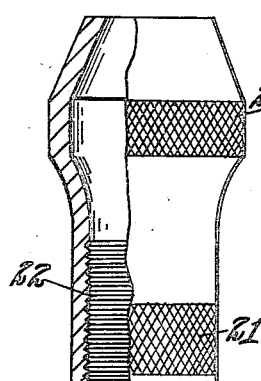
Fig. 7 is a similar view of the product showing it after the operations outside of the dies are performed upon it.

I have shown the invention as applied to the manufacture of a chuck sleeve for bit braces but it will be understood that it is capable of use for other articles of a similar shape. The complete chuck sleeve is illustrated in Fig. 7. In order to make it I cut out a round piece of wrought or sheet metal and draw it out in a pair of dies to a form represented in Fig. 1. Then, by a series of drawing operations which are well known in this art, I proceed to form it into external shapes, shown in Figs. 2, 3 and 4 successively. At some intermediate step in this series of operations I form one of the cup-shaped blanks, as for example the one shown in Fig. 3, by means of an inside plunger having a right angle shoulder near the end of the same so as to form a square shoulder 10 on the blank 11. This provides an internal diameter at 12 materially larger than the internal diameter at 13 constituting the main part of the blank at that point. At the same time an outer shoulder 14 is provided by means of the outer die in a way that will be obvious. I have shown this stop as taken at the third operation but it will be understood that the number of operations between the original flat circular disc and the cup-shape blank shown in Fig. 4 may be more or less than those illustrated and that the shoulder may be formed at some other stage in the operation without departing from the scope of this invention, as expressed in the claims. It is sufficient that this be done at a convenient stage in the operations so that the sharp shoulder 10 will be formed and retained through the rest of the drawing operations, one or more of which should succeed it.

Figure 4:
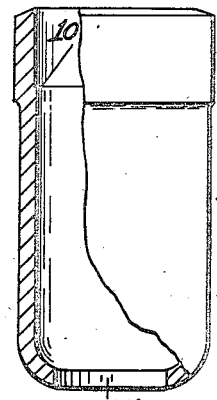

In order to open the end of the tube, I merely punch out the flat bottom at 15, as indicated in Fig. 4. This can be done in addition to, or as a part of, one of the die reducing operations and avoids the necessity of cutting off the tube and throwing away a large part of the metal. In this way the only part that is thrown away as waste is the thin small disc cut out of the bottom. It will be observed that as the process goes on, as so far described, the bottom end of the blank is thinned out so that finally the part that is punched through is quite thin. This is desirable to secure the necessary strength at the conical end of the finished article and also reduces the waste.

Figure 5:
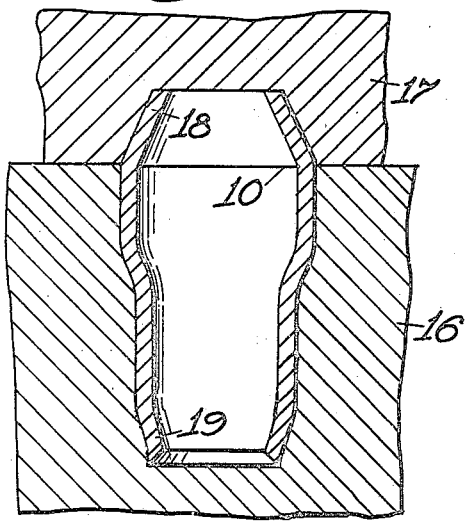
Fig. 5 is a sectional view of a pair of dies for receiving the blank shown in Fig. 4 and further modifying it.
Figure 6:
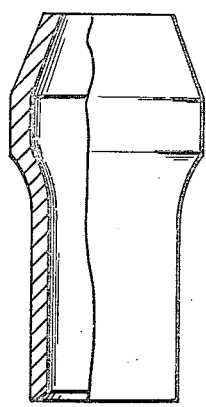
Fig. 6 is a side view partly in section of the article completed as far as the work in dies is concerned.

The blank shown in Fig. 4 is then transferred to a set of external dies, as indicated in Fig. 5. On account of the formation of the shoulder 10 and the opening at 15, I can place this blank in two external dies 16 and 17 without any internal core and force the dies together so as to force the blank into them to fit the exterior of it, thus reducing the diameter at the bottom and forming the cone 18 at the top. The shoulder or rather the depression which forms the shoulder
10 permits this operation to take place without the expense of an internal plunger as it furnishes a line about which the wall 18 of the blank can be bent by the external die 17 without distorting the blank and without the use of anything inside it to keep the shape of the inner surface. This cone is shaped conveniently on account of the shoulder 10 above described having normally a little thicker metal at the bottom than at the top. This permits the end to be drawn in to form a true cone on the outer surface without distorting the inner surface and the device is finished at that end by this operation. In this figure the other part of the article, that shown there at the bottom, is only partially finished, the lower end 19 being forced into the die and thereby compressed inwardly. In the next operation this part is further reduced by a drawing die to form the blank shown in Fig. 6 which is the finished blank so far as the drawing operations are concerned. The rest of the operations to be performed on it are the metal finishing operations, such as knurling at the points 20 and 21, and screw threading the surface at 22 inside. But it will be understood that these metal finishing operations are performed or not, or any others substituted for them, to produce any particular article.

It will be observed that the shoulder 10 is a very important feature as it permits of the formation of the cone 18 without the use of an internal conical die which could not be used in a blank of the shape shown in that figure because it could not be drawn out through the contracted lower end. This permits such a blank to be made and used in the process and enables me to form the other end by punching out the bottom at 15 instead of cutting it off. Thus only a small amount of metal is wasted. By the two subsequent steps, shown in Fig. 5 and indicated in Fig. 6, the smooth surface which is left by punching out the bottom is converted into the chamfered open end which may be finished or not in accordance with the use to which the article is to be put.

Although I have illustrated and described the formation of a specific article and a definite series of steps for making it, I am aware of the fact that the invention can be carried out for the production of other articles and the number of steps can be increased or decreased or otherwise varied by anyone skilled in the art without departing from the scope of the invention as expressed in the claims.

Therefore, I do not wish to be limited to the particular article shown or to the specific number and order of steps illustrated, but what I do claim is:—

1. The method of making a hollow metal article having an open tapered end which consists in forming a tubular blank, forming an internal sharp shoulder near said open end, and then longitudinally compressing the metal blank in hollow dies, one of which has a conical cavity therein to bend inwardly the open end about said shoulder as a center.

2. The method of making a hollow metal article which consists in performing a series of drawing operations on a blank of sheet metal to provide a cup shaped blank having a cylindrical wall open at one end, shaping the interior of said blank at the open end to provide a cylindrical surface having a flat shoulder at its outer end and a cylindrical surface beyond it in the blank of a smaller diameter concentric therewith and terminating at the shoulder, and then forcing in the open end of the blank in a hollow external die to bend it at the shoulder and to form it into conical shape, whereby the conical open end is provided without using a plunger or core of the same shape.

3. The method of making a hollow metal article which consists in performing a series of drawing operations on a blank of sheet metal to provide a tubular blank having a cylindrical wall open at one end, shaping the interior of said blank at the open end to provide a cylindrical surface having a transverse flat shoulder at its outer end and a cylindrical surface beyond it of a smaller diameter concentric therewith and terminating at the shoulder, punching out the opposite closed end of the blank to form an opening therethrough having a diameter smaller than the interior of the blank, then forcing in the open end of the blank by the pressure on the exterior thereof to bend it at the shoulder and form it into conical shape, whereby a conical open end is provided, and forcing the punched out end of the blank into a hollow die to reduce its diameter near the punched out end and commence to straighten out the walls at the end adjacent to the part previously punched out.

4. The method of making a chuck sleeve which consists in drawing out a blank of sheet metal to provide a cup-shaped blank having a cylindrical wall open at one end, shaping the interior of said blank at the open end to provide a cylindrical surface having a flat transverse shoulder at its outer end and a cylindrical surface beyond it of a smaller diameter, punching out the opposite closed end of the blank to form an opening therethrough smaller than the interior of the blank, then forcing in the open end of the blank to form it into conical shape, having its base larger than the other end of the blank, drawing out the punched out end of the blank to reduce its diameter near the punched out end and commence to straighten out the walls adjacent to the part previously punched out, and finally drawing out the part of the blank constituting the end adjacent to the part punched out to form it into a uniform cylindrical shape smaller than the base of the conical end.

5. The method of making a hollow chuck sleeve which consists in drawing out a blank of sheet metal to provide a cup-shaped blank having a cylindrical wall open at one end, drawing out the interior of said blank at the open end to provide a flat shoulder at a distance from its outer end, thinning the opposite closed end of the blank, punching said closed end out to form an opening therethrough smaller than the interior of the blank, forcing in the open end of the blank to form it into conical shape, reducing the punched out end of the blank, drawing out the part of the blank constituting the end adjacent to the part punched out to form it into a uniform cylindrical shape, and screw threading the interior of said cylindrical surface to form threads for the spindle of a bit brace.

In testimony whereof I have hereunto affixed my signature.

HJALMAR G. CARLSON.